United States Patent
Nicosia et al.

(10) Patent No.: US 7,509,753 B2
(45) Date of Patent: Mar. 31, 2009

(54) APPARATUS FOR INDICATING OIL TEMPERATURE AND OIL LEVEL WITHIN AN OIL RESERVOIR

(75) Inventors: Tony Nicosia, Brookfield, WI (US); Craig DeRuyter, Belgium, WI (US); Jeffary R. Sonnentag, Waukesha, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 208 days.

(21) Appl. No.: 10/882,026

(22) Filed: Jun. 30, 2004

(65) Prior Publication Data

US 2006/0000103 A1    Jan. 5, 2006

(51) Int. Cl.
  *G01F 23/04*  (2006.01)
  *G01F 23/00*  (2006.01)
(52) U.S. Cl. .............................. 33/716; 33/719; 33/722; 73/149; 73/861.03; 73/292
(58) Field of Classification Search .................. 33/713, 33/714, 716, 719, 721, 722–730; 374/45, 374/54; 73/149, 861–861.03, 290 R, 291, 73/292, 304 R, 304 C
See application file for complete search history.

(56) References Cited

U.S. PATENT DOCUMENTS

| | | | | |
|---|---|---|---|---|
| 3,098,914 A | * | 7/1963 | Giannino | 33/722 |
| 4,154,105 A | * | 5/1979 | Mackley | 73/292 |
| 4,437,497 A | * | 3/1984 | Enander | 141/1 |
| 4,596,141 A | * | 6/1986 | Kondo | 33/722 |
| 4,807,201 A | * | 2/1989 | Fryda et al. | 367/99 |
| 4,928,525 A | * | 5/1990 | Aderholt et al. | 73/290 V |
| 5,299,456 A | | 4/1994 | Steiner | |
| 5,743,231 A | | 4/1998 | Reinosa | |
| 5,942,688 A | * | 8/1999 | Kimura et al. | 73/598 |
| 6,029,514 A | * | 2/2000 | Adam et al. | 73/149 |
| 6,301,947 B1 | | 10/2001 | McCombs, Jr. | |
| 6,370,952 B1 | * | 4/2002 | Little et al. | 73/304 R |
| 6,443,000 B1 | * | 9/2002 | Pugh et al. | 73/149 |
| 6,615,658 B2 | * | 9/2003 | Snelling | 374/54 |

OTHER PUBLICATIONS

"° F. Stick" Oil Temperature Gauge, Custom Chrome Chrome Specialties World's Finest Products for Harley Davidson, Published prior to Jun. 30, 2003, p. 16.101.

* cited by examiner

*Primary Examiner*—Christopher W Fulton
(74) *Attorney, Agent, or Firm*—Michael Best & Friedrich LLP

(57) ABSTRACT

A dipstick that measures and externally indicates the temperature and level of a fluid within a fluid reservoir. For example, in one embodiment the dipstick measures and externally indicates the oil temperature and oil level of oil within an oil reservoir of a motorcycle or other vehicle. The fluid temperature and level are indicated on an externally viewable portion of the dipstick, such as an exposed end or cap. The viewable portion indicates the fluid level when the fluid temperature is within guidelines recommended by the manufacturer or when the fluid temperature reaches a minimum threshold temperature.

6 Claims, 4 Drawing Sheets

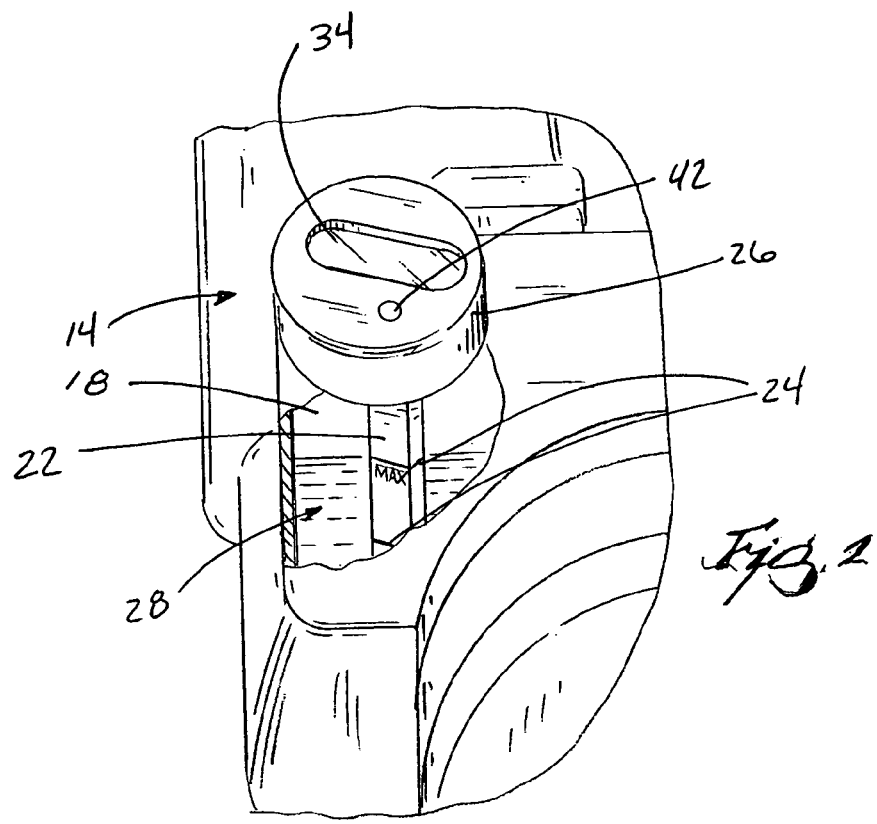
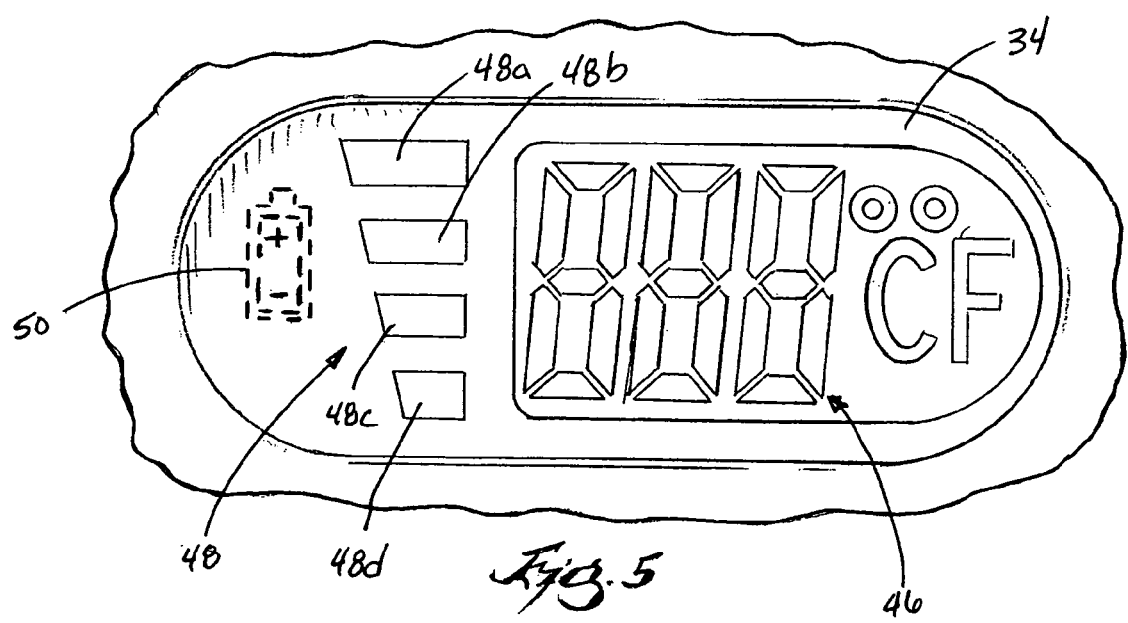

APPARATUS FOR INDICATING OIL TEMPERATURE AND OIL LEVEL WITHIN AN OIL RESERVOIR

BACKGROUND

Oil is used to lubricate many moving parts within an engine. The oil is stored in a reservoir and can be delivered to the moving parts of the engine in many different ways. A desired, predetermined level or quantity of oil should be available in the reservoir to lubricate the moving parts to minimize the risk of damaging the engine. Generally this desired level or quantity falls within a range of acceptable levels. If the oil level falls outside the acceptable range, the engine may be susceptible to damage. Thus, manufactures recommend verification of the oil level periodically by using an oil dipstick, as is known in the art.

Many engine or vehicle manufactures also prescribe recommended conditions for checking the oil level. For example, some recommend checking the oil level while the engine (or oil) is cold, while others recommend checking the oil level when the engine is at normal operating temperature or above a desired temperature. Some known oil dipsticks externally indicate temperature so that the oil level can be checked when the oil temperature falls within the desired temperature range. Specifically, when the dipstick indicates that the proper oil temperature has been reached, the oil dipstick can be removed and the level of oil on the dipstick compared against markings on the dipstick to determine whether or not the oil level is acceptable.

SUMMARY OF THE INVENTION

The present invention is directed toward a dipstick that measures and externally indicates the temperature and level of a fluid within a fluid reservoir. Specifically, one embodiment is directed toward an oil dipstick for a vehicle, such as a motorcycle. The oil temperature and level can be indicated on an externally viewable portion of the dipstick, such as an exposed end or cap. Some embodiments indicate the oil level on the external indicator only when the oil temperature is within the guidelines recommended by the manufacturer or when the oil temperature reaches a minimum threshold temperature.

These and other aspects of the present invention, together with the organization and operation thereof, will become apparent from the following detailed description of the invention when taken in conjunction with the accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

BRIEF DESCRIPTION OF THE DRAWINGS

FIG. 2 is an enlarged perspective view of the oil dipstick illustrated in FIG. 1.

FIG. 5 is an enlarged view of a display of the oil dipstick illustrated in FIG. 2.

DESCRIPTION OF THE ILLUSTRATED EMBODIMENTS

Figure 1:
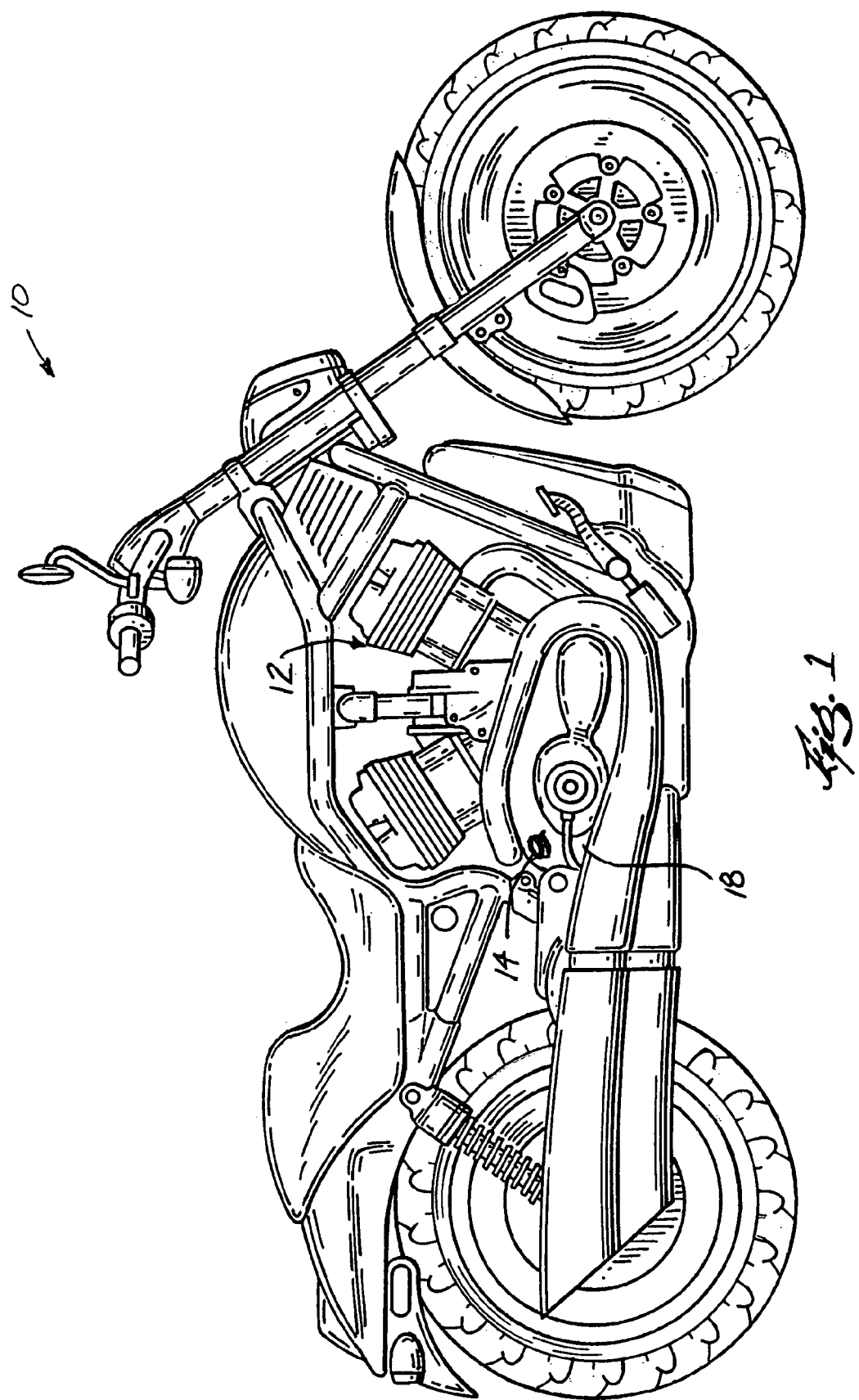
FIG. 1 is a side view of a motorcycle having an oil dipstick according to one embodiment of the present invention.

FIG. 1 illustrates a motorcycle 10 including an engine 12 having an oil reservoir 18 and an oil dipstick 14 according to one embodiment of the present invention. The reservoir can be an oil tank of a dry sump system, an oil pan of a wet sump system, or any such reservoir for storing oil used to lubricate the engine 12. Although FIG. 1 illustrates a motorcycle, some embodiments of the invention can be used with other types of vehicles.

As illustrated in FIG. 2, the dipstick 14 has a first portion or stem 22 that is at least partially received within the oil reservoir 18 and a second portion or cap 26 that is positioned external to the oil reservoir 18. The stem 22 includes conventional fluid level markings 24 to visibly indicate the level of the oil 28 upon removal of the dipstick 14 from the reservoir 18. The cap 26 is positioned external to the oil reservoir 18 and is coupled to the oil reservoir 18 in a conventional manner. For example, it can be threaded onto the reservoir 18, coupled to the reservoir 18 by a quick release mechanism, held in place by friction, or secured in any suitable manner.

Figure 6:
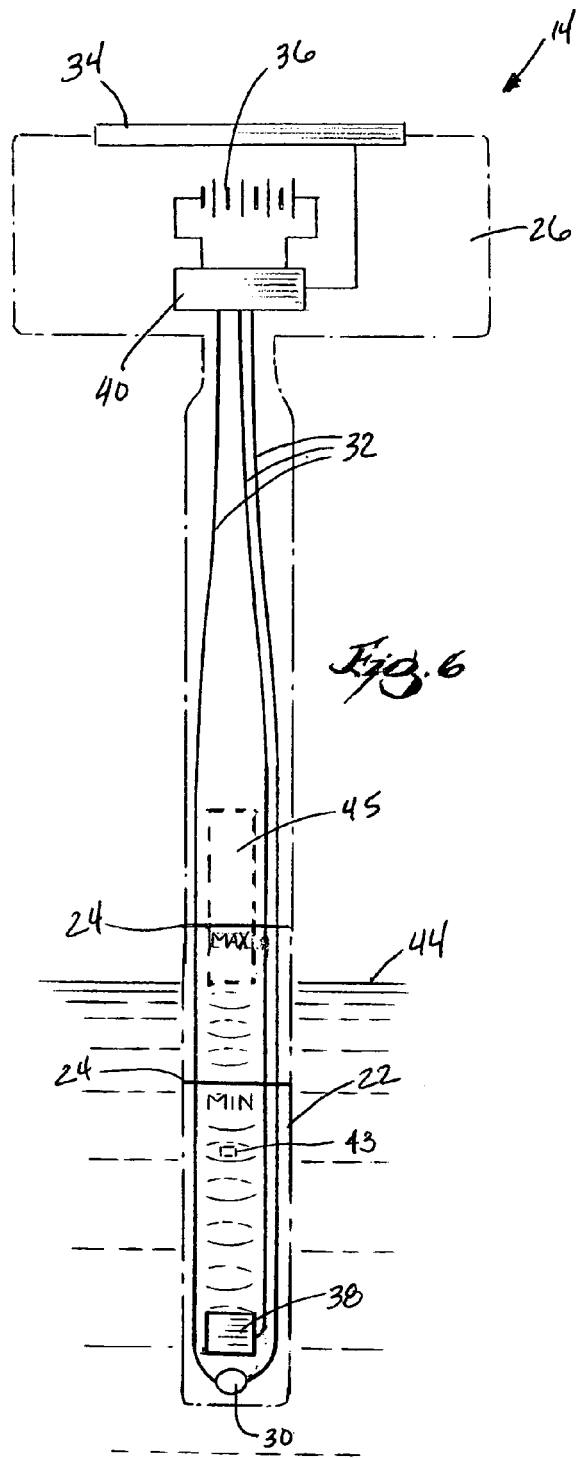
FIG. 6 is a schematic view of the oil dipstick illustrated in FIG. 2.

As shown in FIG. 6, the oil dipstick 14 includes a controller 40, a battery 36, a temperature sensor 30, an oil level sensor 38, and an external indicator or display 34. The battery 36 is electrically coupled to and is the power source for the controller 40, temperature sensor 30, oil level sensor 38, and the display 34. The temperature sensor 30 generates a signal representative of the oil temperature, and the oil level sensor 38 generates a signal representative of the oil level. The illustrated controller 40 is electrically coupled by wires 32 to the sensors 30 and 38 and receives the signals from the sensors 30 and 38. In other embodiments, the signals can be transmitted via wireless communications. The controller 40 is also electrically coupled to the display 34, which externally indicates the temperature and level of the oil based upon the signals generated by the sensors 30 and 38 and received by the controller 40. The display 34 is coupled to the cap 26 and is externally viewable.

The illustrated temperature sensor 30 includes a thermocouple coupled to the stem 22 at a location submerged within the oil of the reservoir 18 to determine the temperature of the oil. The thermocouple measures the temperature of the oil within the reservoir 18 and transmits a signal representative of the temperature to the controller 40. The controller 40 uses the indicator 34 to externally indicate the temperature of the oil without removing the dipstick 14 from the reservoir 18 (herein referenced as externally viewable).

The illustrated oil level sensor 38 includes a piezo sensor to determine the oil level within the reservoir 18. The piezo sensor is positioned on the stem 22 at a position that is below the minimum acceptable amount of oil within the reservoir 18. As such, the piezo sensor is designed to remain below the oil within the reservoir 18 while the dipstick 18 is coupled to the reservoir 18.

The piezo sensor has a sender and a receiver. The sender transmits sonic waves upward toward the surface 44 of the oil. The surface 44 of the oil echoes at least some of the waves back toward the piezo sensor. In alternative embodiments, a float 45 (shown in broken lines) within a hollow portion of the stem 22 echoes the waves back towards the piezo sensor. The receiver then receives the echoed waves. By measuring the amount of time it takes for the receiver to receive the echoed waves, the level of the oil within the reservoir 18 can be calculated or otherwise determined.

In some embodiments, the piezo sensor may calibrate periodically or with each measurement. Certain characteristics of oil, such as the temperature and viscosity, can make the waves propagate at different speeds through the oil. For example, calibration may be required where the chemical composition, temperature, and/or viscosity of the oil changes over time. The piezo sensor can be calibrated by sending a wave toward a portion of the dipstick 14 that is positioned within the oil. For example, a submerged projection 43 (FIG. 6) can be provided on the dipstick 14 at a known distance from the piezo sensor. Since the distance between the sensor and the projection is known, a wave echoed off of the projection and received by the sensor can be used to measure the speed of wave propagation and calibrate the sensor. An integrated circuit or the controller 40 can perform the calibration.

One embodiment of the externally viewable indicator 34 is illustrated in FIG. 5. In this embodiment, the indicator 34 is a Liquid Crystal Display (LCD). The indicator 34 includes temperature and level indicators 46, 48. In other embodiments, however, other types of indicators can be used, such as an analog indicator. The temperature indicator 46 can display the oil temperature in either Fahrenheit or Centigrade, as selected by the user.

As illustrated in FIG. 5, the level indicator 48 includes multiple illuminated bars 48a-d that represent the oil level. Generally, an acceptable oil level within the oil reservoir 18 can vary. For example, motorcycles can have a four-quart capacity. However, a range of slightly over about three quarts of oil to slightly over four quarts can be considered an acceptable oil level for operation. As such, the display 34 can indicate when the oil level is outside of this range and when the oil level is within this range. For example, the illustrated display 34 has four bars 48a-d representing a range of acceptable oil levels to operate the motorcycle 10. Illuminating all of the bars 48a-d indicates that the reservoir 18 is full or within about the top twenty-five percent of the acceptable range. Similarly, illuminating only the lowest bar 48d can indicate that the oil level is within about the lower twenty-five percent of the acceptable range.

The indicator 34 also provides a warning to alert the operator when the oil level is outside of the acceptable range. For example, the indicator 34 illustrated in FIG. 5 causes the highest bar 48a or all of the bars 48a-d to flash on and off to indicate that more than an acceptable level of oil is within the reservoir. This may occur, for example, when the reservoir 18 is overfilled by more than about one-eighth of a quart of oil. Also, the lowest bar 48d flashes on and off to indicate that less than the acceptable level of oil is within the reservoir 18. This can occur when, for example, less than about three quarts of oil are within a four-quart, full capacity reservoir.

The illustrated indicator 34 also displays the power level remaining in the battery 36. For example, a low battery indicator 50 can display a warning upon a desired level of discharge from the battery 36, such as when less than about twenty-five percent of the total charge remains. In the illustrated embodiment, a symbol of a battery is illuminated to indicate that the battery is low. Alternatively, the battery symbol can be programmed to flash on and off when the battery charge is low.

Figure 3:
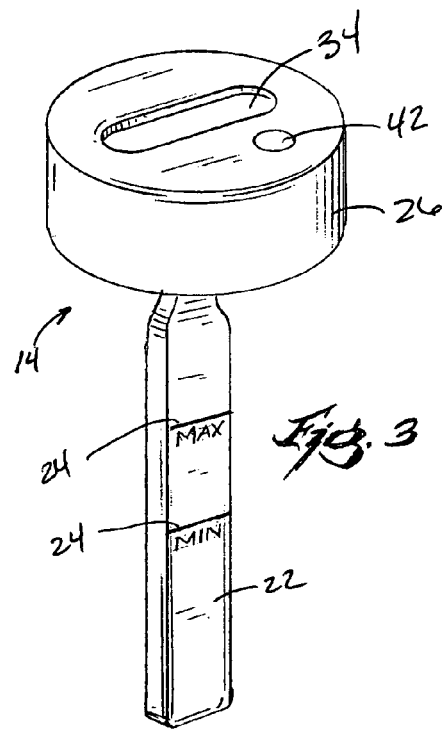
FIG. 3 is a perspective view of the oil dipstick illustrated in FIG. 2.
Figure 4:
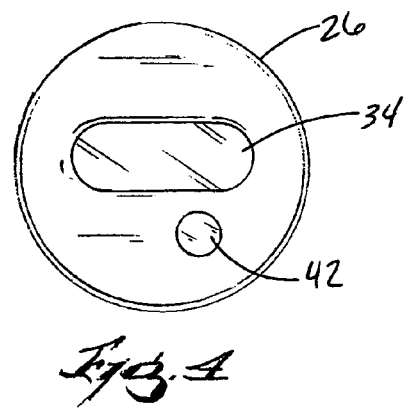
FIG. 4 is a top view of the oil dipstick illustrated in FIG. 2.

The indicator 34 selectively displays information on demand to prolong the life of the battery 36. In other words, the indicator 34 will only display information upon activation by the user. In the illustrated embodiment shown in FIGS. 3 and 4, a user actuates a button 42 positioned adjacent the indicator 34 to cause information to be displayed. The information could then be displayed for a finite period of time. For example, the information can be displayed for only a few seconds or it can be displayed for a few minutes depending upon the how the button 42 is actuated. In the illustrated embodiment, the information is displayed for five seconds when the button 42 is pressed once and the information is displayed for as long as fifteen minutes when the button 42 is pressed twice within two seconds.

The dipstick 14 is programmed such that it will only provide an oil level indication when the oil temperature is within a range specified by the manufacturer for checking oil level. Some manufacturers recommend that the oil level should be checked only when the oil temperature is at a recommended temperature. For example, Harley-Davidson Motor Company recommends checking the oil level of some of its motorcycles only after the oil is one-hundred and sixty degrees Fahrenheit. However, most users are not aware when the oil has reached or exceeded the recommended temperature. Thus, the dipstick 14 is programmed to indicate oil level only when the oil is within the temperature range recommended by the manufacturer. As such, the indicator 34 on the Harley-Davidson® motorcycle discussed above would not provide an oil level indication until the sensed oil temperature is at least one hundred and sixty degrees Fahrenheit. Other manufacturers recommend checking the oil level at various other temperatures. For example, some recommend checking the oil level only when the oil is cold. As such, the indicator 34 can be programmed to only provide oil level indications while the oil temperature is below a threshold value (such as one-hundred and sixty degrees Fahrenheit). Furthermore, if an operator attempts to check the oil level while the temperature is outside the recommended range of temperatures, the oil level will not be indicated and the temperature indication on the indicator 34 will flash.

Figure 7:
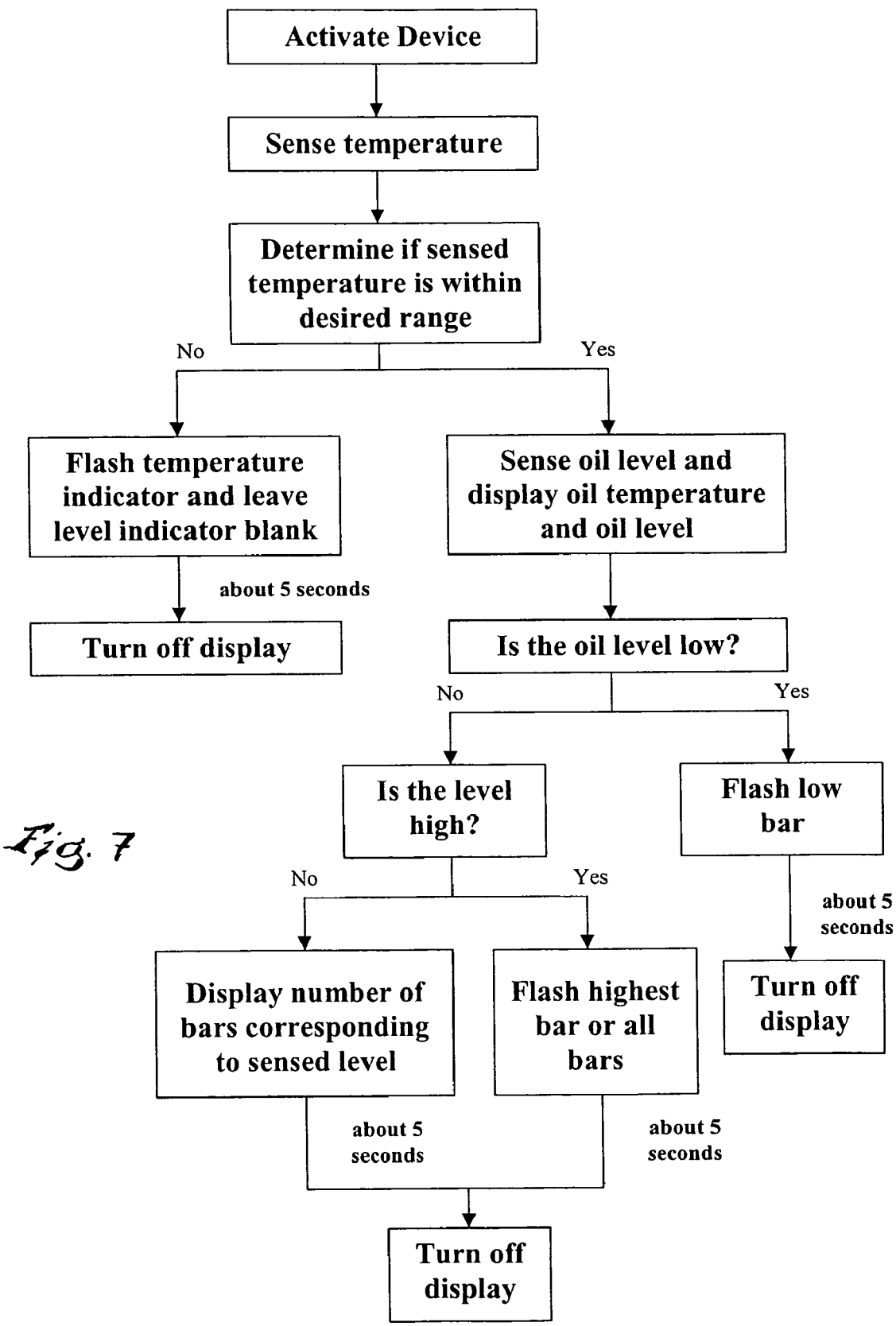
FIG. 7 is a flow chart illustrating a logic sequence for a controller according to one embodiment of the present invention.

In operation, an operator will actuate the button 42 on the cap 26 of the dipstick 14 to initiate the process of checking the oil temperature and oil level. Upon activation of the button 42, the controller 40 will perform the following steps, as illustrated in FIG. 7. First, the oil temperature will be sensed. Then, the controller 40 will determine whether the oil temperature is within the desired range. If the temperature is not within the desired range, the temperature indicator 46 will flash and the oil level indicator 48 will not display the oil level. If, however, the temperature is within the desired range, the oil level will be sensed and the oil temperature and level will be displayed on the indicator 34. If the sensed oil level is too low, the lowest bar 48d on the oil level indicator 48 will flash. If the sensed oil level is too high, all of the bars 48a-d or the highest bar 48a on the oil level indicator 48 will flash. If the oil level is determined to be within the acceptable range, the oil level indicator 48 will display a number of bars 48a-d that best corresponds with the sensed level.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the operations performed in the flow chart illustrated in FIG. 7 can be performed in a different order and/or some steps indicated as separate steps can be performed simultaneously. For example, the oil level can be sensed prior to determining whether the oil temperature is within the desired range.

Additionally, the sensors described above can be placed on structures other than a dipstick. In some embodiments, the sensors can be directly or indirectly coupled to the reservoir. For example, the sensors can be coupled to a wall of the reservoir, or they can be coupled to another apparatus that is coupled to the reservoir. In such an embodiment, the sensors can be designed to communicate with a display on the dipstick.

Various features of the invention are set forth in the following claims.

We claim:

1. A method of indicating the fluid temperature and fluid level within a fluid reservoir of a vehicle, the method comprising:
    sensing the temperature of the fluid within the reservoir with a first sensor;
    providing a second sensor within the reservoir having a sender and a receiver;
    transmitting sonic waves toward the surface of the fluid with the sender;
    receiving reflected sonic waves with the receiver;
    determining the level of the fluid by measuring the time between transmitting with the sender and receiving reflected waves with the receiver; and
    displaying the fluid level and fluid temperature on an externally viewable indicator only when the fluid temperature is greater than a minimum threshold temperature.

2. The method of claim 1, wherein displaying the fluid level includes displaying the fluid level and fluid temperature on an externally viewable indicator only when the fluid temperature is within a temperature range.

3. The method of claim 1, further comprising providing a float at the surface of the fluid, and reflecting sonic waves towards the receiver with the float.

4. The method of claim 1, further comprising calibrating the second sensor.

5. The method of claim 4, further comprising providing a projection on a dipstick at a known distance from the second sensor, wherein calibrating the second sensor includes transmitting sonic waves toward the projection, receiving with the receiver the sonic waves reflected by the projection, measuring the time between transmitting with the sender and receiving reflected waves from the projection with the receiver, and calibrating the second sensor based on the known distance and the time between transmitting with the sender and receiving reflected waves from the projection with the receiver.

6. A dipstick adapted for use with an engine and a fluid reservoir containing fluid, the dipstick comprising:
    a cap securable to the fluid reservoir to enclose the fluid reservoir;
    an indicator adapted to display the fluid temperature and fluid level external to the reservoir when the cap is secured to the fluid reservoir; and
    a controller programmed such that the indicator provides a fluid level indication only when the fluid temperature is within a desired temperature range.

* * * * *